(12) United States Patent
Lee

(10) Patent No.: US 6,540,129 B2
(45) Date of Patent: Apr. 1, 2003

(54) APPARATUS AND METHOD FOR MANUFACTURING SOLDER BALLS

(75) Inventor: Choong-Won Lee, Daegu (KR)

(73) Assignee: Spraytech, Ltd., Daegu (KR)

( * ) Notice: Subject to any disclaimer, the term of this patent is extended or adjusted under 35 U.S.C. 154(b) by 0 days.

(21) Appl. No.: 09/900,956

(22) Filed: Jul. 10, 2001

(65) Prior Publication Data
US 2002/0005429 A1 Jan. 17, 2002

(30) Foreign Application Priority Data

Jul. 14, 2000 (KR) ........................................ 2000-40557
May 28, 2001 (KR) ........................................ 2001-29407

(51) Int. Cl.[7] .......................... B23K 31/02; B23K 1/00; B23K 1/06
(52) U.S. Cl. ............................ 228/262; 228/33; 228/41; 228/110.1
(58) Field of Search .................. 228/262, 104, 228/33, 37, 41, 110.1, 1.1; 266/202; 222/593; 438/754; 75/335

(56) References Cited

U.S. PATENT DOCUMENTS

| | | | | |
|---|---|---|---|---|
| 5,226,326 A | * | 7/1993 | Polen et al. ................... | 73/571 |
| 5,520,052 A | * | 5/1996 | Pechersky ...................... | 73/579 |
| 5,586,715 A | * | 12/1996 | Schwiebert et al. ........ | 164/129 |
| 5,855,323 A | * | 1/1999 | Yost et al. ................... | 219/243 |
| 5,988,480 A | * | 11/1999 | Farnworth .................. | 228/260 |
| 6,055,391 A | * | 4/2000 | Jackson et al. ............. | 356/614 |
| 6,215,121 B1 | * | 4/2001 | Fujihira et al. ............. | 250/306 |
| 6,261,671 B1 | * | 7/2001 | Asai et al. ................... | 174/259 |
| 6,312,498 B1 | * | 11/2001 | Lee et al. .................... | 222/593 |

FOREIGN PATENT DOCUMENTS

| | | | |
|---|---|---|---|
| JP | 10211468 A | * | 8/1998 |
| JP | 2000144216 A | * | 5/2000 |

* cited by examiner

Primary Examiner—Tom Dunn
Assistant Examiner—Zidia Pittman
(74) Attorney, Agent, or Firm—Jacobson Holman PLLC

(57) ABSTRACT

An apparatus and method for manufacturing solder balls used for an electrical and/or mechanical connection between a semiconductor chip and a substrate are provided. The apparatus includes a melting furnace having a nozzle through which a molten solder paste flows and drops, for producing solder balls; a vibrating mechanism attached to the nozzle of the melting furnace, for applying vibration to the nozzle; and a vibration controlling mechanism for controlling the vibration frequency of the vibrating mechanism to adjust the size of the solder balls dropped from the nozzle. The method includes the steps of setting a vibration frequency according to a desired solder ball size, applying vibration to a nozzle with the set vibration frequency, making the molten solder paste flow through the nozzle to manufacture solder balls of a predetermined size according to the vibration frequency, and measuring the size of the manufactured solder balls. Since the solder balls are manufactured using nozzle vibration, the accuracy, roundness and recovery efficiency of the solder balls are excellent. Also, because the apparatus and method for manufacturing solder balls is simplified, productivity is increased.

4 Claims, 4 Drawing Sheets

APPARATUS AND METHOD FOR MANUFACTURING SOLDER BALLS

BACKGROUND OF THE INVENTION

1. Field of the Invention

The present invention relates to an apparatus and method for manufacturing solder balls used for an electrical and/or mechanical-connection between a semiconductor chip and a substrate.

2. Description of the Related Art

Along with the recent development of highly integrated semiconductor technology, consumers prefer miniaturized electronic products. Accordingly, surface mounting technologies (SMT) have been in widespread use. Technologies for minimizing the mounting space of a semiconductor device, such as Ball Grid Array (BGA) or flip chip bonding, are also being widely employed in packaging semiconductor devices. In order to connect such semiconductor devices with printed circuit board (PCB) substrates, solder balls are used. For example, in a BGA package having a plurality of solder ball seating holes on its rear surface, solder balls are seated in the solder ball seating holes for attaching the BGA package onto a PCB and carried to a furnace for connection, during the manufacture of an electronic device. In other words, the drive to pursue highly efficient, miniaturized, lightweight electronic devices, and to add additional functions to such equipment, has resulted in an ongoing drive for a change in the shape or mounting technique. Specifically, preferred mounting techniques have changed from insertion type mounting using wires into SMT in which solder balls are arranged under an integrated circuit to be directly adhered to a substrate. The SMT can reduce the mounting ability, which is currently more than 3 times that of an IC chip size, to 1.2 times the chip size, thereby reducing the area of a PCB required for connection of chips of a constant size to approximately one ninth (⅑) the chip size. Since solder balls used in SMT are quite small, it is difficult to manufacture the same by an ordinary fabrication technique. It is also difficult to maintain the solder balls at uniform roundness and size. Further, solder ball manufacturing processes are complex and the yield thereof is poor, which makes mass production of solder balls difficult to achieve. Also, the continuously developing microelectronics industry requires that solder balls be more accurately controlled in size.

Conventional techniques for manufacturing solder balls include wire cutting, disc cutting, pulse atomization and the like. According to the wire cutting technique, wires are cut and are subjected to a heating furnace to become a molten solder, that is, a liquid phase solder. The liquid phase solder is turned into spheres by surface tension of liquid, which is cooled to produce solder balls. The wire cutting process is complex, requiring 34 processing steps from preparation of materials to packaging.

According to the disc cutting technique, as shown in FIG. 1, a panel-like solder 101 is punched to make a disc 102 into a constant size and then heated to produce solder balls 103, like in the wire cutting technique. The disc cutting technique requires 19 processing steps, that is, the processing complexity is somewhat improved compared to the wire cutting technique. However, the disc cutting technique still involves many processing steps and considerable complexity. Also, since the size, roundness, diameter and physical properties of products are attached at uniform levels, the productivity is poor, and, in particular, it is quite difficult to comply with the desire for miniaturizing the sizes of solder balls.

According to the pulse atomization method, as shown in FIG. 2, a molten solder is disturbed by means of a vibrator 202 in a melting furnace 201 to make a molten solder paste supplied from a nozzle 203 into spheres using turbulence. However, according to the pulse atomization method, a vibrating plate 202=amay experience non-uniform vibration due to a distribution in the temperature of the molten solder throughout the melting furnace 201, a Marangoni effect in the melting furnace 201 or natural convection. Accordingly, the solder balls produced are not uniform in size, resulting in deterioration of quality. In order to obtain uniform sized solder balls rather than different sized solder balls, multiple steps of size assortment must be performed, which degrades the productivity and yield.

SUMMARY OF THE INVENTION

To solve the above-described problems, it is an object of the present invention to provide an apparatus and method for continuously manufacturing smaller solder balls in uniform sizes.

To accomplish the above object; there is provided an apparatus for manufacturing solder balls, the apparatus including a melting furnace having a nozzle through which a molten solder paste flows and drops, for producing solder balls; a vibrating means attached to the nozzle of the melting furnace, for applying vibration to the nozzle; and a vibration controlling means for controlling the vibration frequency of the vibrating means to adjust the size of the solder balls dropped from the nozzle.

According to another aspect of the present invention, there is provided a method for manufacturing solder balls, the method including the steps of setting a vibration frequency according to a desired solder ball size, applying vibration to a nozzle with the set vibration frequency, making the molten solder paste flow through the nozzle to manufacture solder balls of a predetermined size according to the vibration frequency, and measuring the size of the manufactured solder balls. Since the solder balls are manufactured using nozzle vibration, the accuracy, roundness and recovery efficiency of the solder balls are excellent. Also, the apparatus and method for manufacturing solder balls can be simplified, thereby increasing the productivity.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

A preferred embodiment of the present invention will now be described in detail with reference to the accompanying drawings.

Figure 1:
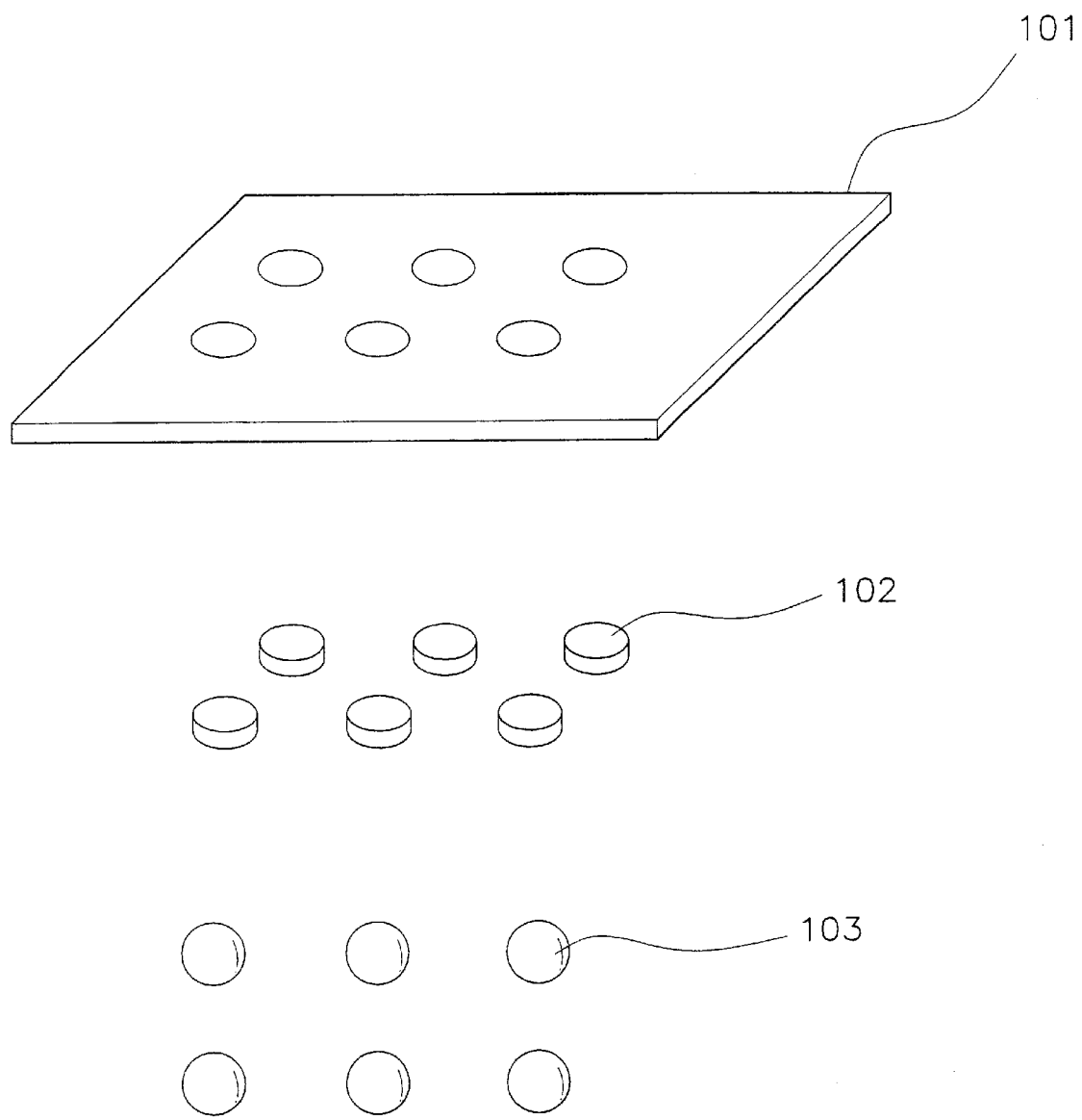
FIG. 1 is a diagram for explaining the concept of a conventional solder ball manufacturing method.
Figure 2:
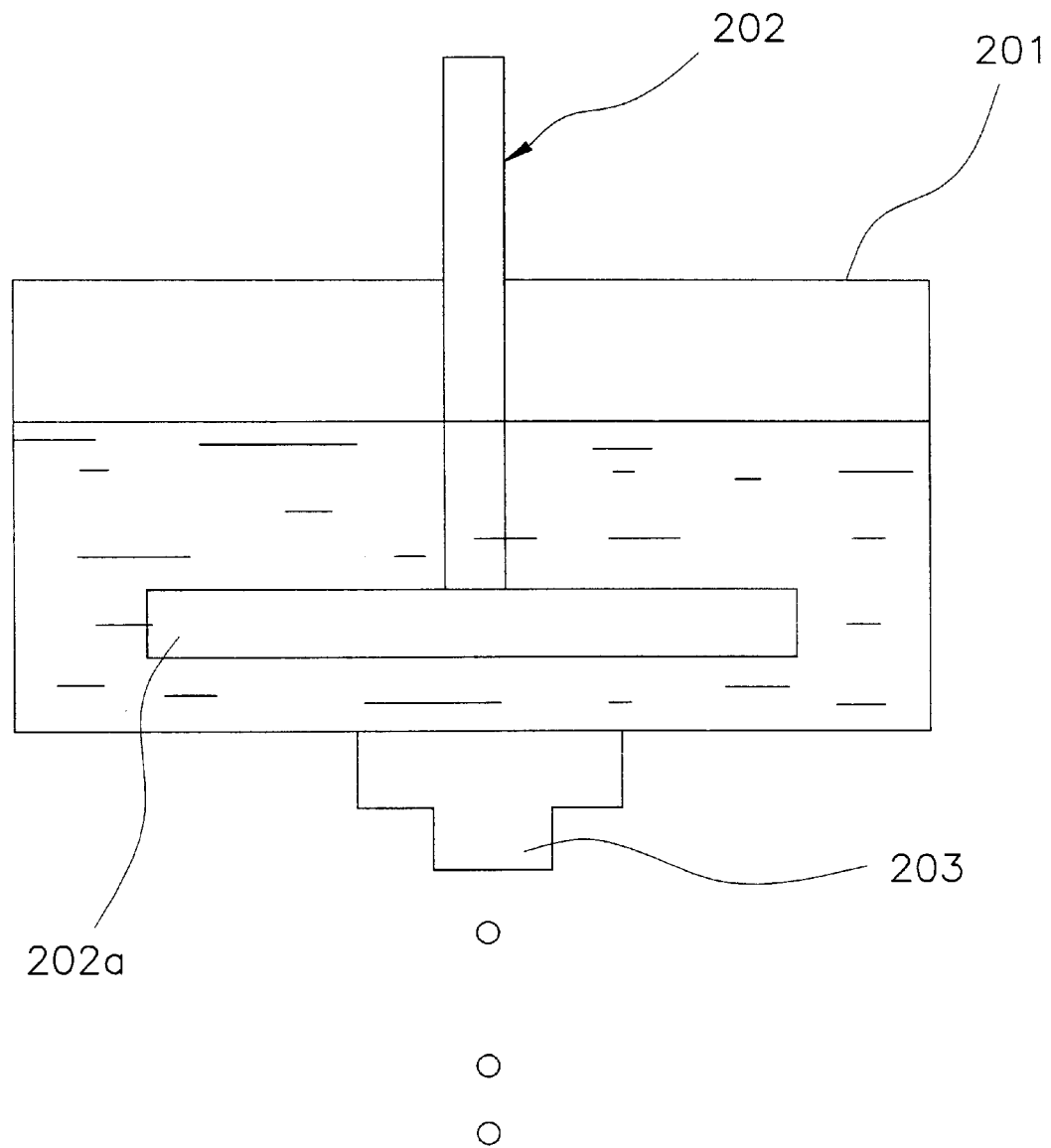
FIG. 2 is a schematic diagram of a conventional apparatus for manufacturing solder balls.
Figure 3:
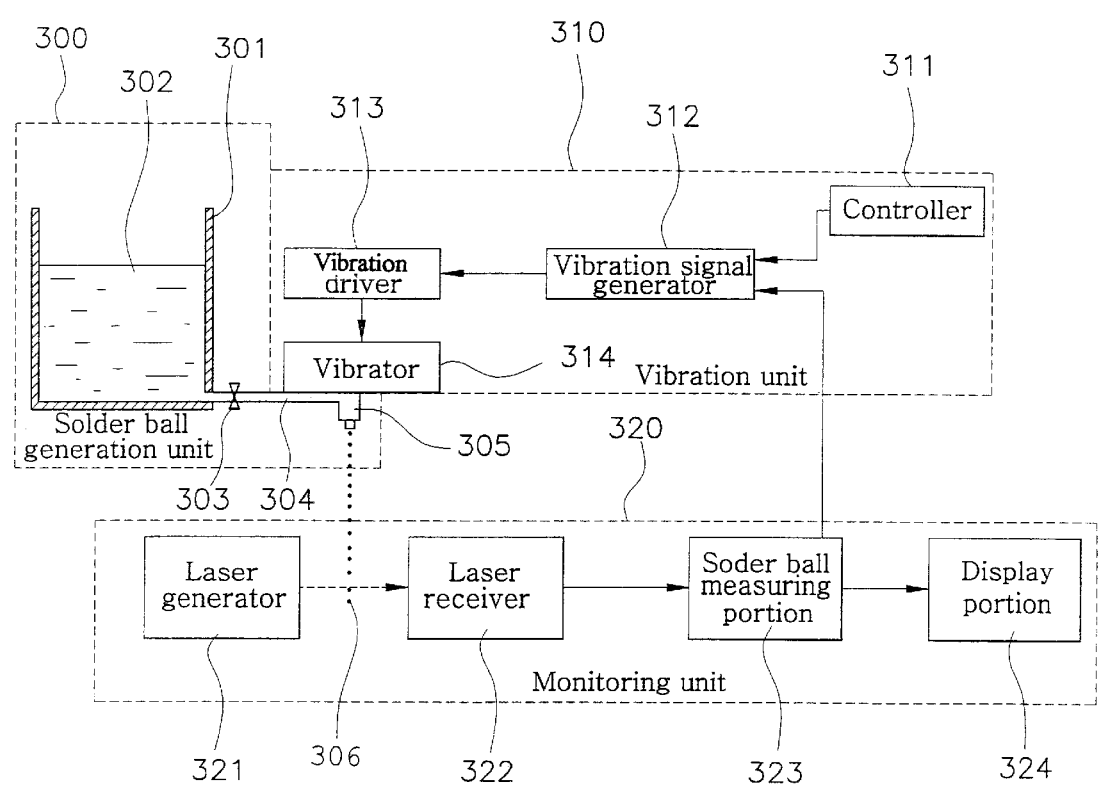
FIG. 3 is a schematic diagram of an apparatus for manufacturing solder balls according to the present invention.

As shown in FIG. 3, a solder ball manufacturing apparatus according to the present invention includes a solder ball generation unit 300 for generating solder balls from a molten solder paste 302, a vibration unit 310 for providing vibration to the solder ball generation unit 300 to control the size of generated solder balls, and a monitoring unit 320 for monitoring the size of the solder balls.

Referring to FIG. 3, the solder ball generation unit 300 includes a melting furnace 301 containing a molten solder paste 302, a valve 303 for controlling the flow of solder paste, a pipe 304, and a nozzle 305 for generating solder balls 306 whose size is controlled by vibration, using the solder paste. The vibration unit 310 includes a vibration signal generator 312 for generating a vibration signal having a predetermined frequency by manipulating a controller 311, a vibration driver 313 for driving a vibrator according to the output of the vibration signal generator 312, and a vibrator 314 for vibrating the nozzle 305 according to the vibration signal.

An implementation example of the vibration unit 310 will now be briefly described. The vibration signal generator 312 may be embodied in the form of a function generator. The vibration driver 313 may be embodied in the form of an amplifier, and the vibrator 314 may be embodied in the form of a speakerphone. In addition, various types of vibrators responsive to an audio signal, an electrical signal and/or a mechanical signal, can be used as the vibrator 314.

The monitoring unit 320 includes a laser generator 321 for generating laser beams and emitting the same to solder balls 306, a laser receiver 322 for receiving the laser beams transmitted through the solder balls, a solder ball measuring portion 323 for detecting the waveform of a signal received through the laser receiver 322 and outputting a control signal for determining the quality of the solder balls and adjusting the size of solder balls in an automatic mode, and a display portion 324 for displaying the size and quality of the solder balls.

As described above, in the solder ball manufacturing apparatus according to the present invention, the vibrator 314 is attached to the pipe 304 and the nozzle 305 connected to the melting furnace 301 to vibrate the nozzle 305. Thus, the solder ball manufacturing apparatus according to the present invention can solve the problem encountered in the prior art in which natural convention or a Marangoni effect, occurring in the melting furnace when vibration is applied to the melting furnace, affects the vibration of a vibration plate and the pressure of a nozzle, making it necessary to accurately control the temperature distribution of a molten solder for attainment of miniaturization and high performance.

Also, according to the present invention, the size of solder balls can be adjusted by controlling the vibration frequency of the vibrator, and the quality of solder balls can be improved by monitoring the size of the solder balls.

Next, the operation of the above-described solder ball manufacturing apparatus according to the present invention will be described.

The size of solder balls manufactured by the present invention is related to the vibration frequency. Thus, the vibration frequency corresponding to a desired solder ball size is determined and the vibration signal generator 312 is controlled by means of the controller 311 to generate the corresponding frequency.

The vibration signal generator 312 generates a predetermined vibration signal, and the vibration driver 313 amplifies the vibration signal and drives the vibrator 314 attached to the nozzle 305. Accordingly, the nozzle 305 vibrates together with the vibrator 314. Generally, the vibration signal generator 312 generates the corresponding vibration frequency according to desired solder ball size, and the driver 313 amplifies a vibration signal corresponding to the vibration frequency and transmits the amplified signal to the vibrator 314.

The melting furnace 301 contains the molten solder paste 302 produced by melting a solid solder. If the valve 303 is opened, the solder paste 302 contained in the melting furnace 301 flows toward the nozzle 305 connected to the vibrator 314 via the pipe 304.

If the vibrator 314 vibrates, the nozzle 305 attached to the vibrator 314 also vibrates with the frequency applied to the vibrator 314. Here, the speed of the molten solder flowing in the nozzle 305 is accelerated or moderated according to the number of vibrations, so that surface waves are produced on the surface of the pile of the molten solder dropped from the nozzle 305. The surface wave of the molten solder pile increases moving downstream to be turned into molten solder droplets, and further cooled downward, thereby manufacturing predetermined, consistent, uniform sized solder balls.

In order to monitor the size of the manufactured solder balls, there are provided the laser generator 321 and the laser receiver 322. Thus, solder balls of undesired size and abnormal operation can be monitored by continuously checking the size of the solder balls 306, thereby improving the quality of the solder balls 306.

Using the solder ball manufacturing apparatus according to the present invention using nozzle vibration, spheres having a diameter of 0.76 mm, which are made of a material similar to the molten solder in view of viscosity and surface tension, can be manufactured with high accuracy such that a deviation in diameter of the produced spheres is in the range of a predetermined allowance. Also, an average of 300 to 5000 spheres, although varying according to the diameter of the nozzle and desired sphere size, can be manufactured per second.

Figure 4:
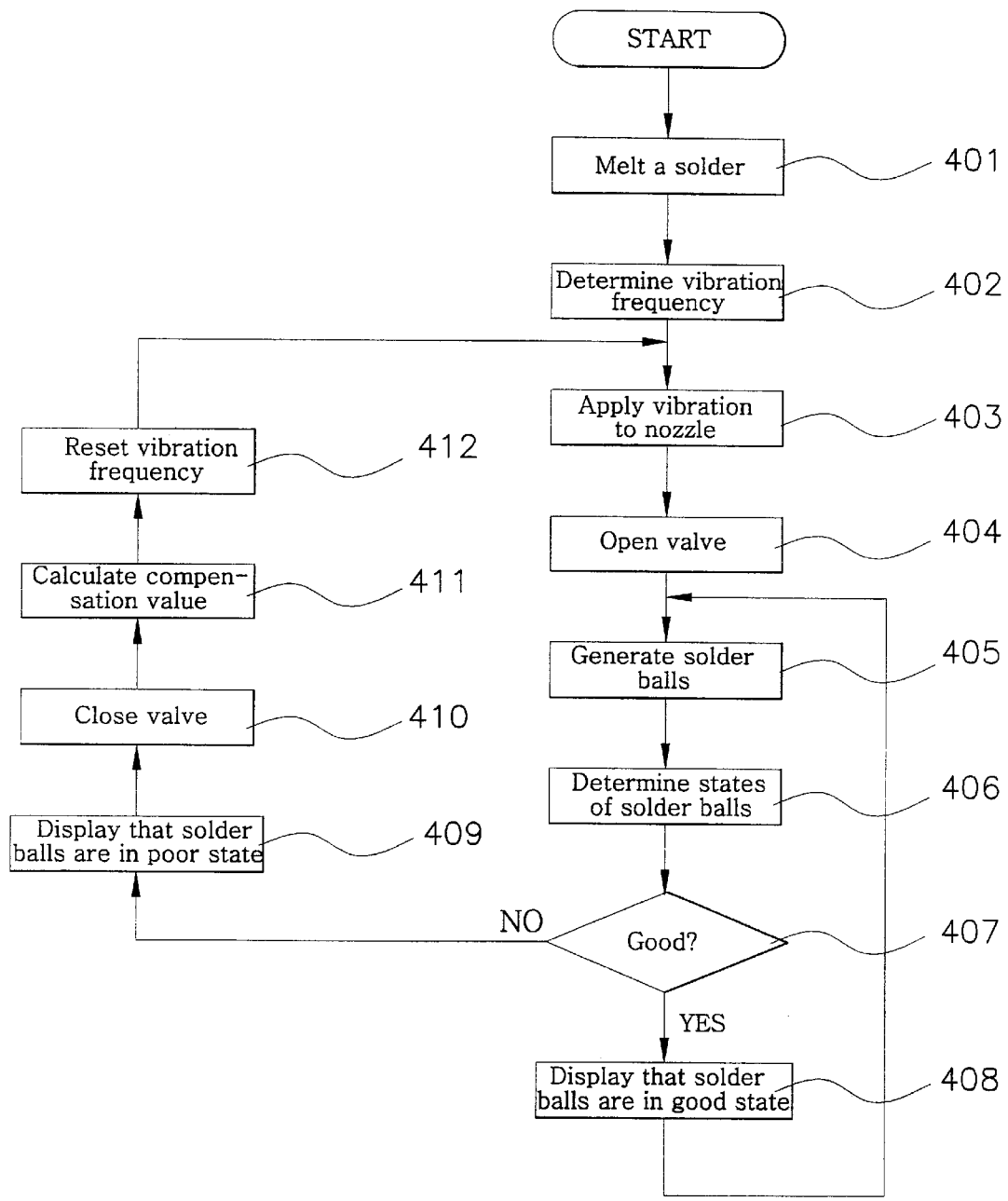
FIG. 4 is a flow chart showing a method for manufacturing solder balls according to the present invention.

FIG. 4 is a flow chart showing a method for manufacturing solder balls according to the present invention. Referring to FIG. 4, a solder is melted in a melting furnace to produce a solder paste, and the vibration frequency is determined according to desired solder ball size (steps 401 and 402). Here, the vibration frequency is set to be in a predetermined range of frequency according to the size of solder balls. As the vibration frequency increases, the solder balls become smaller.

Once a vibration frequency has been determined, a vibration signal is generated according to the determined vibration frequency to drive a vibrator so that vibration is applied to the nozzle (step 403). In a state in which vibration is applied to the nozzle, the valve of the melting furnace is opened so that the solder paste flows outside via the nozzle (step 404). Then, the speed of the molten solder flowing in the nozzle is accelerated or moderated according to the vibration frequency, so that surface waves corresponding to the applied frequency are produced on the surface of the pile of the molten solder dropped from the nozzle. The surface wave of the molten solder pile increases moving downstream to be turned into molten solder droplets, and further cooled downward, thereby manufacturing uniform sized solder balls (step 405).

The thus-manufactured and dropped solder balls are detected as a detection signal by a laser generator and laser receiver to then be applied to a solder ball measurement portion. The solder ball measurement portion determines states of the solder balls from the applied detection signal and displays the determined states on a display portion (step 406).

If it is determined that the manufactured solder balls are in a good state (steps 407 and 408), the steps 405 and 406 are repeated. If there is a defect in the manufactured solder balls, the valve is closed and a compensation value for automatic control is calculated to reset the vibration frequency (steps 409 through 412). Then, the reset vibration frequency is applied to the nozzle and the procedure goes back to step 403 for iteration.

As described above, according to the present invention, the size of solder balls is controlled such that they are kept at a uniform level, through size measurement, quality determination and automatic control of the solder balls, thereby manufacturing good-quality solder balls in a large quantity.

As described above, in the present invention, since the solder balls are manufactured using nozzle vibration, it is not necessary to accurately control the temperature distribution of a molten solder for attainment of miniaturization and high performance, unlike in the prior art in which the vibration of a vibration plate and the pressure of a nozzle are affected by natural convection and a Marangoni effect occurring in a melting furnace when vibration is applied to the melting furnace. Therefore, according to the present invention, the accuracy, roundness and recovery efficiency of solder balls can be greatly improved, compared to the conventional technology. Also, the apparatus and method for manufacturing solder balls can be simplified, thereby increasing productivity.

What is claimed is:

1. An apparatus for manufacturing solder balls comprising:

a melting furnace having a nozzle through which a molten solder paste flows and drops, for producing solder balls;

a vibrating means directly attached to the nozzle of the melting furnace, for applying vibration to the nozzle, said vibrating means driven in response to at least one of an audio signal, an electrical signal and a mechanical signal; and a vibration controlling means for controlling the vibration frequency of the vibrating means to adjust a size of the solder balls dropped from the nozzle.

2. The apparatus of claim 1, further comprising a monitoring unit for monitoring the size of the solder balls dropped from the nozzle.

3. The apparatus of claim 2, wherein the monitoring unit includes a laser generator for generating laser beams, a laser receiver for receiving the laser beams transmitted through the solder balls, and a solder ball measuring portion for determining and displaying a quality determination relative to the solder balls.

4. An apparatus for manufacturing solder balls comprising:

a melting furnace having a nozzle through which a molten solder paste flows and drops, for producing solder balls;

a vibration signal generator for generating a vibration signal at a frequency;

a vibration driver for amplifying said vibration signal at said frequency;

a vibrator directly attached to the nozzle of the melting furnace and driven by said vibration driver such that said nozzle and said vibrator vibrate as a unit at said frequency as applied to the vibrator; and a vibration controlling means for controlling the vibration frequency of the vibrating signal generator to adjust a size of the solder balls dropped from the nozzle.

* * * * *